United States Patent
MacDougall et al.

(10) Patent No.: US 10,987,766 B2
(45) Date of Patent: Apr. 27, 2021

(54) AUTOMATED ELECTROMAGNETIC FASTENER DELIVERY SYSTEM

(71) Applicant: Newfrey LLC, New Britain, CT (US)

(72) Inventors: Jonathan MacDougall, Highland, MI (US); Pradeep Reddy Are, Novi, MI (US); Vijit Dubey, Clawson, MI (US); Benjamin Haymore, Rochester Hills, MI (US); Kevin Kassab, Troy, MI (US)

(73) Assignee: Newfrey LLC, New Britain, CT (US)

( * ) Notice: Subject to any disclaimer, the term of this patent is extended or adjusted under 35 U.S.C. 154(b) by 0 days.

(21) Appl. No.: 16/452,048

(22) Filed: Jun. 25, 2019

(65) Prior Publication Data
US 2020/0406407 A1 Dec. 31, 2020

(51) Int. Cl.
| B23P 19/00 | (2006.01) |
| B23P 19/06 | (2006.01) |
| B27F 7/13 | (2006.01) |
| B21J 15/32 | (2006.01) |

(52) U.S. Cl.
CPC ............ *B23P 19/001* (2013.01); *B21J 15/32* (2013.01); *B23P 19/06* (2013.01); *B27F 7/13* (2013.01)

(58) Field of Classification Search
CPC . B23P 19/001; B23P 19/06; B27F 7/13; B21J 15/32
See application file for complete search history.

(56) References Cited

U.S. PATENT DOCUMENTS

| 1,441,250 | A | * | 1/1923 | Smith | B21J 15/32 |
| | | | | | 221/155 |
| 3,311,259 | A | * | 3/1967 | Brown | H01H 11/005 |
| | | | | | 221/1 |
| 3,494,393 | A | * | 2/1970 | Casanov | B25B 23/12 |
| | | | | | 81/57.37 |
| 3,661,241 | A | * | 5/1972 | Ioffe | B65G 54/02 |
| | | | | | 198/381 |
| 3,753,513 | A | * | 8/1973 | Grenfell | B65G 47/28 |
| | | | | | 221/1 |
| 4,113,142 | A | * | 9/1978 | Ryzhov | B65G 47/26 |
| | | | | | 198/381 |
| 6,047,854 | A | * | 4/2000 | Demers | B01J 4/02 |
| | | | | | 198/619 |
| 7,487,583 | B2 | * | 2/2009 | Craythorn | B21J 15/025 |
| | | | | | 29/809 |
| 8,141,761 | B2 | * | 3/2012 | Draht | B25C 5/1627 |
| | | | | | 227/136 |

(Continued)

*Primary Examiner* — Bayan Salone
(74) *Attorney, Agent, or Firm* — Harness, Dickey & Pierce, P.L.C.

(57) ABSTRACT

A fastener delivery system including a feed tube coupled to a delivery location at a second end of the feed tube. The fastener delivery system includes a fastener feed mechanism comprised of a coil wound around a coupler. The coupler is coupled to the feed tube at a first end of the feed tube. The fastener delivery system includes a fastener positioning device configured to receive a fastener. The fastener positioning device is connected to the coupler and operates to inject the fastener into the coupler. A current is applied through the coil to generate a magnetic field. The magnetic field interacts with the fastener and thereby projects the fastener through the feed tube towards the delivery location.

15 Claims, 5 Drawing Sheets

(56) References Cited

U.S. PATENT DOCUMENTS

Figure 1:
Figure 1:
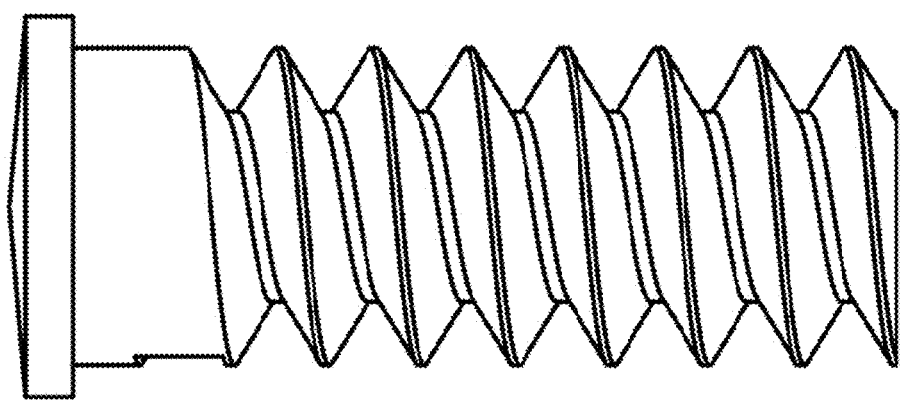

| | | | |
|---|---|---|---|
| 8,424,420 B2 * | 4/2013 | Ranta | B23P 19/006 |
| | | | 81/57.37 |
| 9,375,781 B2 * | 6/2016 | Goehlich | B21J 15/24 |
| 9,963,304 B2 * | 5/2018 | Hodde | B65G 47/912 |
| 10,183,366 B2 | 1/2019 | Sarramoune et al. | |
| 2012/0017728 A1 | 1/2012 | Schmidt | |
| 2017/0252784 A1 | 9/2017 | Ragan | |

* cited by examiner

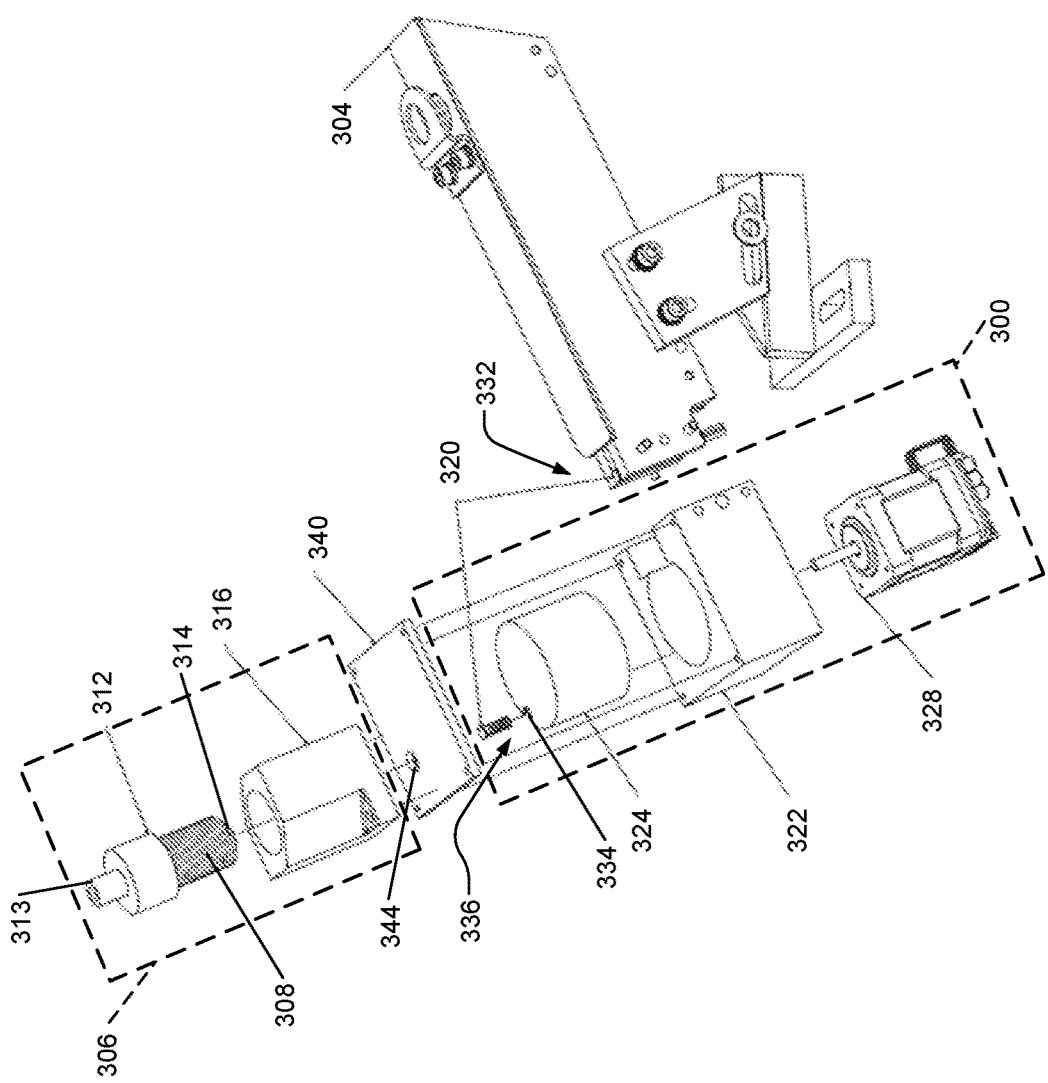
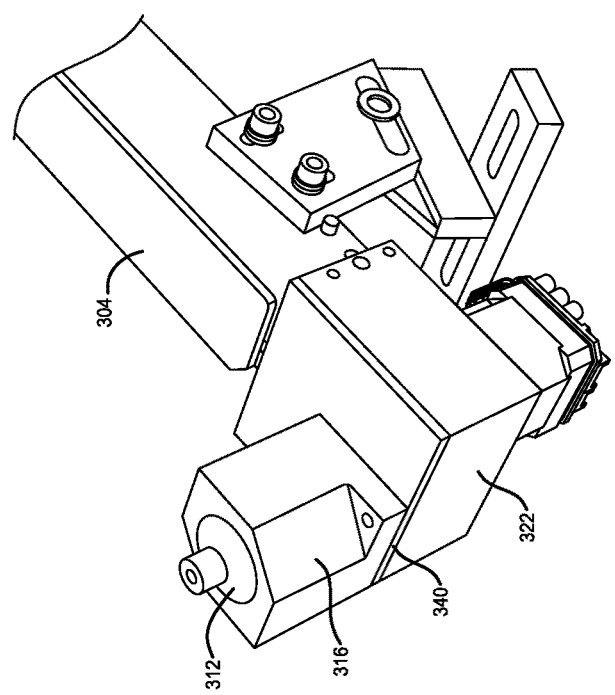
FIG. 3B
FIG. 3A

AUTOMATED ELECTROMAGNETIC FASTENER DELIVERY SYSTEM

FIELD

The present disclosure relates to delivery of fasteners from a storage space to an intermediate space or tool.

BACKGROUND

Commercially available automated industrial fastening systems implement a compressed air fastener delivery system to deliver a fastener to a fastener tool through a tube. However, moving an item with compressed air results in a noisy delivery process that requires additional cost for providing a fastener to a fastener tool The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A fastener delivery system including a feed tube coupled to a delivery location at a second end of the feed tube. The fastener delivery system includes a fastener feed mechanism comprised of a coil wound around a coupler. The coupler is coupled to the feed tube at a first end of the feed tube. The fastener delivery system includes a fastener positioning device configured to receive a fastener. The fastener positioning device is connected to the coupler and operates to inject the fastener into the coupler. A current is applied through the coil to generate a magnetic field. The magnetic field interacts with the fastener and thereby projects the fastener through the feed tube towards the delivery location.

In other aspects, the fastener positioning device includes a slotted rotary drum. The slot receives the fastener at a first position of the rotary drum. The rotary drum is configured to rotate to a second position where the fastener is aligned to the coupler. In other aspects, the delivery location is a fastener tool or an intermediate storage bin. In other aspects, a length of the coil is at least greater than a length of the fastener.

In other aspects, the fastener delivery system includes a drive circuit electrically coupled to the coil, wherein the drive circuit selectively supplies the current through the coil. In other aspects, the drive circuit selectively discontinues the current through the coil after a predetermined condition. In other aspects, the drive circuit includes an energy bank configured to store energy from the power source, a trigger switch interconnected between the coil and the energy bank, and a charging switch interconnected between the energy bank and the power source.

In other aspects, the fastener delivery system includes a power converter interconnected between the charging switch and a power source. The power converter is configured to convert input power to a desired output power. In other aspects, the fastener delivery system includes a controller interfaced with the trigger switch and the charging switch.

DRAWINGS

The present disclosure will become more fully understood from the detailed description and the accompanying drawings.

Figure 2:
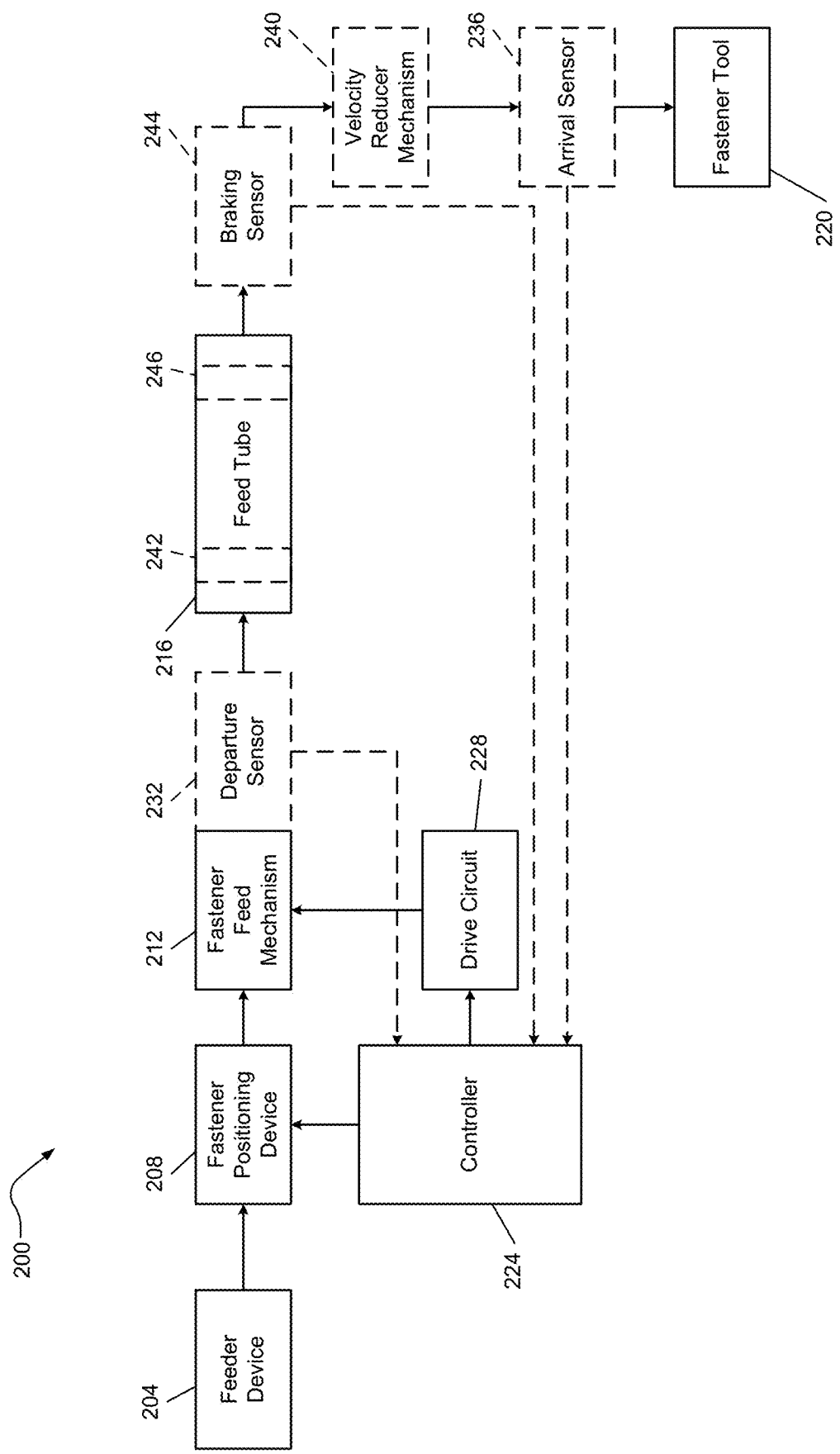
Figure 4:
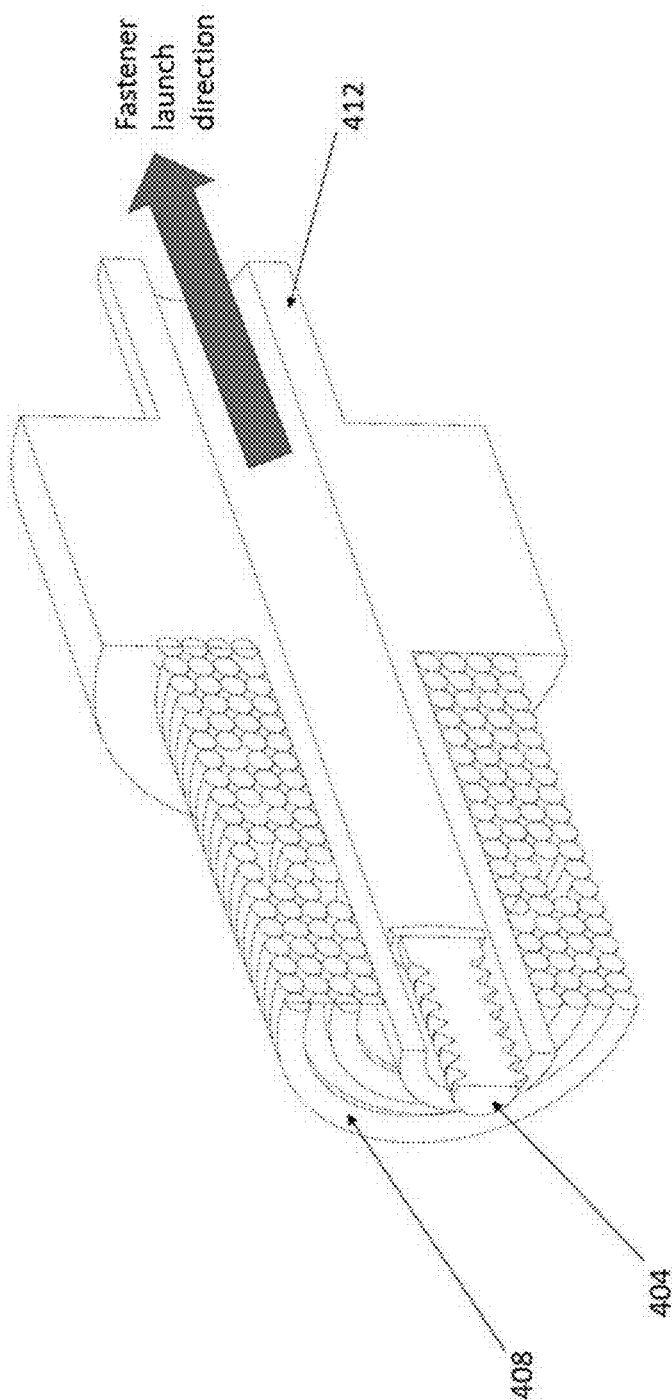
Figure 5:
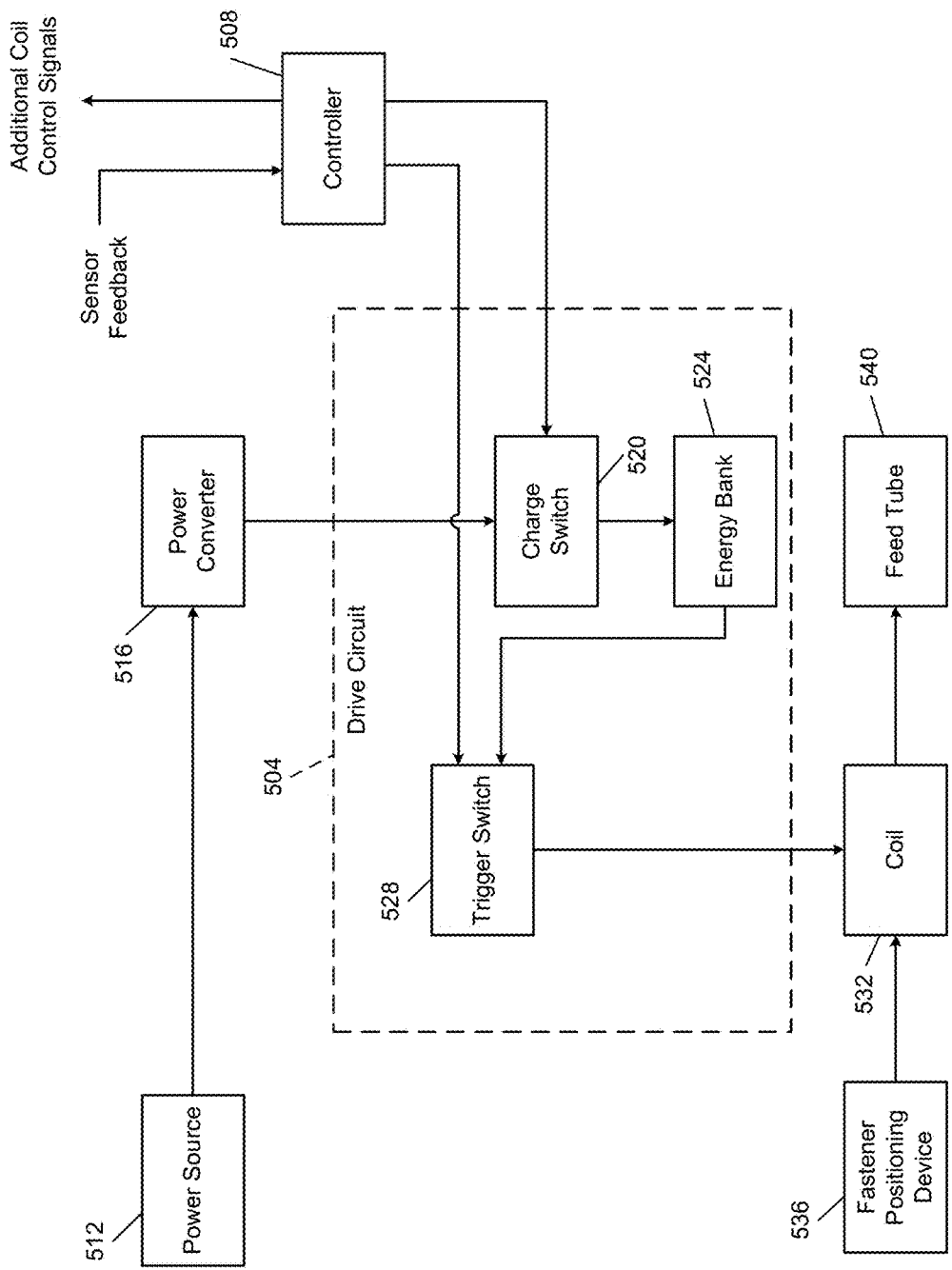

FIG. 1 is a view of an example fastener.
FIG. 2 is a functional block diagram of a fastener delivery system.
FIG. 3A is an example fastener positioning device included in a fastener delivery system.
FIG. 3B is an exploded view of the example fastener positioning device included in the fastener delivery system.
FIG. 4 is an example coil within a fastener feed mechanism of a fastener delivery system.
FIG. 5 is an example functional block diagram of a drive circuit of the fastener delivery system.

DETAILED DESCRIPTION

An automated electromagnetic fastener delivery system generates a magnetic field surrounding a coil to project a fastener to a desired location. A fastener positioning device transfers fasteners from, for example, a storage location or feeder device, to a fastener feed mechanism. The fastener feed mechanism receives the fastener and projects the fastener through an attached feed tube to the desired location. The fastener feed mechanism includes a coupler that attaches to the feed tube. A coil is wound around the coupler and is electrically interfaced to a drive circuit that selectively applies current to the coil, resulting in the generation of the magnetic field around the coil. The fastener positioning device places the fastener adjacent to or partially within the coupler surrounded by the coil. The force of the magnetic field causes the fastener to project from a present position through the feed tube when the fastener is within a predetermined distance from the coil, for example, adjacent to or partially within the coil.

The drive circuit controls when current is applied to the coil. The drive circuit supplies current using energy stored in an energy bank. A power source charges the energy bank when a charge switch is closed. The energy bank supplies current to the coil when a trigger switch is closed, electrically coupling the energy bank to the coil. A controller within the drive circuit controls the opening and closing of the charge switch and the trigger switch. The controller instructs the closing of the charge switch to charge the energy bank in preparation of delivery of a fastener. In addition, the controller instructs the trigger switch to close to supply current to the coil when a fastener is to be delivered to the desired location. The controller may receive feedback from a plurality of sensors located along the fastener delivery system, indicating a location of the fastener that is being or will be projected. Further, the controller may receive a signal from an external source, triggering the projection of the fastener.

In an example embodiment, the desired location is a fastener tool that is configured to secure the fastener to a final destination, such as welding a metal fastener to a car body. Alternatively, the desired location may be an intermediate location where the fastener is stored. In additional embodiments, the feed tube has one or more additional coils with the controller switching the current to additional coil or coils to provide a boost function, continuing the projection of the fastener along the feed tube to the desired location.

FIG. 1 depicts an example fastener 100. The example fastener supplied by the fastener delivery system may be a T5×14, 1.6 mm thread, stud made of 1010 steel, and is ferromagnetic. The fastener supplied by the fastener delivery system may include a stud, a rivet, a bolt, a nut, a nail, a peg, a pin, and other hardware configured to mechanically join objects together.

Referring to FIG. 2, an example functional block diagram of a fastener delivery system 200 is shown. The fastener delivery system 200 generally includes a feeder device 204, a fastener positioning device 208, a fastener feed mechanism 212, a feed tube 216, a fastener tool 220, a controller 224, and a drive circuit 228. The feeder device 204 supplies fasteners to the fastener positioning device 208 The fastener positioning device 208 places the fastener at or adjacent to the fastener feed mechanism 212 to project the fastener through the feed tube 216 to the fastener tool 220. The fastener feed mechanism 212 includes a coil wrapped around a coupler that connects to the feed tube 216. The coil is made of wire to generate the magnetic field in response to the controller 224 supplying a large current through the coil. The feed tube 216 may be variable in length depending on the application, typically 4 to 20 meters in length.

The controller 224 controls the fastener positioning device 208, instructing the fastener positioning device 208 to precisely position a fastener in alignment with the fastener feed mechanism 212. The fastener may be positioned at the edge, or partially within the fastener feed mechanism 212. An indication that the prior fastener has been projected by the coil may be provided by an optional departure sensor 232. The departure sensor 232 is configured to sense a presence of fastener and transmit a signal indicating such presence to the controller 224. In additional embodiments, the placement of the fastener at the fastener feed mechanism 212 by the fastener positioning device 208 is in response to an external trigger or source.

The magnetic field force produced by the coil projects the fastener at a high velocity into the feed tube 216. The feed tube 216 transfers the fastener from the fastener feed mechanism 212 to the fastener tool 220. The feed tube 216 may be flexible to undergo turns and twists. The controller 224 also controls the drive circuit 228. More specifically, the controller 224 operates the opening and closing of switches included in the drive circuit 228. For example, the controller 224 closes a trigger switch of the drive circuit 228 to project the fastener from the fastener feed mechanism 212 through the feed tube 216 to the fastener tool 220. Once the trigger switch is closed, stored energy is supplied to the coil of the fastener feed mechanism 212 to project the fastener.

The fastener feed mechanism 212 may be a hollow coupler that is inserted into the feed tube 216. The coil is electrically coupled to the drive circuit 228, which supplies a current to the coil based on control instructions from the controller 224. When the current is applied across the coil, a magnetic field is generated that causes a fastener placed near the coil to project towards the fastener tool 220 through the feed tube 216. An external signal may also trigger the supply of current to the coil of the fastener feed mechanism 212 to project the fastener to the fastener tool 220.

The controller 224 closes the trigger switch for the predetermined time. The predetermined time may correspond to a time it takes for the stored energy to be drained or when the fastener is halfway through the coil. When the trigger switch is opened at a time that the fastener is halfway through the coil, the magnetic field generated by the current supplied to the coil is eliminated prior to the fastener passing a halfway point of the coil so that the magnetic field does not work against the fastener, slowing the fastener down. Turning off the current supply prevents the fastener from experiencing a force in an opposite direction after passing through the least reluctance position of the coil (for example, the halfway point), eliminating any pullback effects.

The departure sensor 232 may be located adjacent to the fastener feed mechanism 212 or, more specifically, at the exit of the coil. The departure sensor 232 detects the presence of the fastener. The departure sensor 232 communicates with the controller 224 to indicate whether has departed after passing the current through the coil. Similarly, the controller 224 can also verify, based on data sensed by the departure sensor 232, that the coil of the fastener feed mechanism 212 successfully launched the fastener into the feed tube 216 after the trigger switch is closed. In additional embodiments, the fastener delivery system 200 also includes an arrival sensor 236 located at the entrance of the fastener tool 220. The arrival sensor 236 is also configured to communicate with the controller 224 to confirm whether the fastener arrived at the desired location, for example, the fastener tool 220.

In various embodiments, the fastener delivery system 200 may further include a velocity reducer mechanism 240. The velocity reducer mechanism 240 includes another coil to decrease the speed of the fastener when nearing the fastener tool 220. The coil of the velocity reducer mechanism 240 is comprised of winding copper magnet wire on a hollow tube that is conducting in nature to assist in reducing the fastener speed Other embodiments of the velocity reducer mechanism 240 may include a separate drive circuit and a separate energy bank (not shown) operated by the controller 224. The controller 224 may determine when the fastener is nearing the fastener tool 220 based on feedback from the braking sensor 244. Otherwise, a predetermined travel time of the fastener may be known representing how long it takes the fastener to reach the fastener tool 220 after being projected from the fastener feed mechanism 212. Then, as the fastener approaches, the separate drive circuit may apply a current to the coil of the velocity reducer mechanism 240 to slow the fastener when approaching the fastener tool 220.

To increase the reliability of the feeding strategy, a multi-stage booster may be included along the fastener delivery system 200. The multi-stage booster may include additional boost coils, for example, within a first booster 242 and a second booster 246. The multi-stage booster may include fewer or greater than two boosters. The first booster 242 and the second booster 246 may be included along the feed tube 216 to ensure the fastener reaches the desired location.

The first booster 242 and the second booster 246 may each have a corresponding drive circuit and capacitor bank for energy storage. The first booster 242 and the second booster 246 each include a coil that generates a magnetic field and, optionally, a fastener sensor. In alternative embodiments, the fastener sensors and coils of each booster are separately attached along the feed tube 216. Each fastener sensor detects a presence of a projected fastener. Each fastener sensor may be placed a predetermined distance in front of the coil of each booster 242 and 246. Once the fastener sensor identifies a presence of the projected fastener, the controller 224 instructs the corresponding drive circuit to close a trigger switch, resulting in current being applied to the corresponding coil of the corresponding booster 242 or 246. The corresponding coil will generate a magnetic field and further project the fastener along the feed tube 216.

The timing of the closing of the trigger switch corresponds to an estimated time that the projected fastener is expected to be within a predetermined distance of the coil of each booster 242 and 246. The fastener sensors are configured to transmit a presence of the projected fastener to the controller 224. Each coil provides an additional boost to the fastener while traversing the feed tube 216. The multi-stage booster not only makes the electromagnetic feeding more reliable, but also decreases fastener feeding times.

FIGS. 3A and 3B depict an example fastener positioning device 300 coupled with a feeder device 304 and a fastener feed mechanism 306. The fastener feed mechanism 306 generally includes a coil 308, a coupler 312, and a coil cover 316. The coil 308 is wound around the coupler 312. The coupler 312 is connected to the feed tube of FIG. 2 at a first end 313 of the coupler 312 and couples to the fastener positioning device 300 at a second end 314 of the coupler 312. The second end 314 of the coupler 312 may be inserted into the feed tube of FIG. 2 or the feed tube of FIG. 2 may be inserted into the coupler 312. The coil cover 316 surrounds the coil 308 to protect the coil 308. The coil cover 316 is also configured to receive the coupler 312. The coil 308 is an enameled copper wire that is wound on a hollow non-conducting tube or the coupler 312. A ferrous fastener 320, such as the fastener of FIG. 1, is positioned at the second end 314 of the coupler 312 by the fastener positioning device 300. The coupler 312 includes an opening through a length of the coupler 312 allowing the fastener 320 to project through the coupler 312 to the connected feed tube.

An electronic circuit charges a capacitor bank to a high voltage and the circuit triggers the charged capacitor bank to release stored energy to the coil 308. As a result, the coil 308 is excited with a high current pulse and creates a low reluctance zone at or near a center of the hollow tube around which the coil 308 is wound. When current flows through the coil 308, the fastener 320 that is positioned at or near the entrance of coil experiences the induced magnetic field. The fastener 320 is strongly pulled into the low reluctance zone at the center of the coil 308 in response to the induced magnetic field. The induced magnetic field propels the fastener at high velocity through the coil 308.

The fastener positioning device 300 isolates a single fastener 320 at a time in order to keep the coil 308 from effecting multiple fasteners. The fastener positioning device 300 generally includes a non-ferrous housing unit 322, a non-ferrous rotary drum 324, and a motor 328. The fastener positioning device 300 interfaces with the fastener feed mechanism 306 via a spacer cover 340. The fastener 320 travels from the rotary drum 324 to the fastener feed mechanism 306 through an opening 344 of the spacer cover 340. The opening 344 is sized for the fastener 320, allowing the fastener 320 to pass through the opening 344 of the spacer cover 340 in response to a generated magnetic field produced by the coil 308. The spacer cover 340 thickness is application specific, for example, 1 to 8 millimeters in thickness, ensuring the magnetic field will have an effect on the fastener 320.

The non-ferrous rotary drum 324 is operated by the motor 328. The motor 328 rotates the rotary drum 324 to collect the fastener 320 at a first position 332 from the feeder device 304. The rotary drum 324 is configured to receive the fastener 320 in a slot 334. Once the fastener 320 is positioned in the slot 334 at the first position 332, the motor 328 rotates the rotary drum 324 to a second position 336. That is, the feeder device 304 will present the fastener 320 to the rotary drum 324 where the fastener 320 will fit into the slot 334 sized for the fastener 320. From there, the motor 328 will rotate and align the fastener 320 to the second position 336, adjacent to the coil 308 by means of either precise motor control or pre-engineered hard stops. The size of the rotary drum 324 and angle of rotation are defined in a way that adequately separates the fastener 320 from any others in the feeding queue in the feeder device 304 so the coil 308 will only affect the fastener 320 when the fastener 320 is at the second position 336. Once the coil 308 is magnetized, the fastener 320 travels through the opening 344 of the spacer cover 340 and through the coupler 312 to the feed tube.

After the coil 308 fires the fastener 320, the motor 328 turns the rotary drum 324 back to the first position 332 where a new fastener is presented and the cycle repeats. In various embodiments, the departure sensor of FIG. 2 may indicate to the fastener positioning device 300 when the fastener 320 is projected through the coil 308 so the fastener positioning device 300 can then be instructed to collect another fastener from the feeder device 304.

Referring now to FIG. 4, an example coil within a fastener feed mechanism is shown. A fastener 404 is positioned by the fastener feed mechanism near or partially within a coil 408 wound around a coupler 412. An example coil 408 is made of a 14-gauge wire and includes 80 to 100 turns, including 4 to 5 layers, totaling 28 millimeters in length. The length of the coil may vary based on the application. The coil length is at least as long as the fastener that projects through the coil. The coupler 412 is configured to connect to a feed tube, for example, by being inserted into the feed tube. A current is applied to the coil 408, causing the fastener 404 to project through the feed tube.

Referring now to FIG. 5, an example functional block diagram of a drive circuit 504 of the fastener delivery system is shown. The drive circuit 504 is controlled by a controller 508. As described above, the controller 508 may receive sensor feedback from the optional sensors, such as the departure sensor and the arrival sensor. The controller 508 may receive sensor feedback from additional sensors corresponding to additional coils. The additional sensors indicate a location of a projected fastener and, in response to detecting the projected fastener, the controller 508 may generate and transmit additional coil control signals to provide the boost function described above to assist the movement of the projected fastener along the feed tube.

The drive circuit 504 receives power from a power source 512, which provides power to the fastener delivery system. A power converter 516 receives power from the power source 512 and converts the power as needed. For example, the power converter 516 may convert power from AC to DC if the power source 512 is an AC source outlet. Additionally or alternatively, the power converter 516 may convert from DC to DC increasing or decreasing the voltage, for example, from 24 volts to 400 volts. The increase in voltage increases the velocity at which the fastener is projected, providing the ability to control the velocity of the fastener. Another power converter (not shown) supplies power to the controller 508. In various embodiments, the controller for the drive circuit 504 is separate from the controller 508 and included in the drive circuit 504.

A charge switch 520 connects the power converter 516 to an energy bank 524. The energy bank 524 can be a capacitor bank of two or more capacitors connected in parallel and configured to store energy. The controller 508 is configured to operate the opening and closing of the charge switch 520 to disconnect and connect the power converter 516 to the energy bank 524. When the charge switch 520 is closed, the power converter 516 is connected to the energy bank 524 and charges the energy bank 524 by storing energy at a particular voltage. When the charge switch 520 is open, the power converter 516 is not connected to the energy bank 524 and is no longer charging the energy bank 524. The controller 508 is configured to charge the energy bank 524 for a predetermined time or until the energy bank 524 is fully charged. Then, the controller 508 charges the energy bank 524 again after the energy bank 524 is depleted or reduced by closing of the trigger switch 528.

A trigger switch 528 connects the energy bank 524 to a coil 532. Similar to the charge switch 520, the controller 508 controls the opening and closing of the trigger switch 528. When closed, the trigger switch 528 connects the energy bank 524 to the coil 532 and supplies current to the coil 532. When current is applied across the coil 532, a high surge current is passed through the coil 532 to generate a magnetic field. The magnetic field applies a force to ferrous items within a predetermined vicinity, such as a fastener that the fastener positioning device 536 has placed adjacent to or partially within the coil 532. In response to the magnetic field, the fastener is projected through the coil 532 and through a feed tube 540 that ends at a desired location. When open, the trigger switch 528 disconnects the energy bank 524 from the coil 532, ending the supply of current and discontinuing the magnetic field. As described above, the controller 508 is configured to close the trigger switch 528 in response to an external trigger. The controller 508 is further configured to avoid pullback of the fastener by disconnecting the current by opening the trigger switch 528 once the fastener reaches a middle point of the coil. The middle point may be determined by another sensor or by opening the trigger switch 528 after a predetermined time.

In additional embodiments including the multi-stage boost function, an additional drive circuit, such as the one described in FIG. 5, is provided for each coil providing a boost. The controller 508 may be configured to activate each additional coil's trigger switch when a sensor detects the presence of a projected fastener approaching the additional coil.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:
1. A fastener delivery system, comprising:
a feed tube coupled to a delivery location at a second end of the feed tube;
a fastener feed mechanism comprised of a coil wound around a coupler, wherein the coupler is coupled to the feed tube at a first end of the feed tube; and
a fastener positioning device configured to receive a fastener, wherein the fastener positioning device is connected to the coupler and operates to inject the fastener into the coupler, wherein a current applied through the coil generates a magnetic field, and wherein the magnetic field interacts with the fastener and thereby projects the fastener through the feed tube towards the delivery location.
2. The fastener delivery system of claim 1, wherein the fastener positioning device includes a rotary drum including a slot, wherein the slot receives the fastener at a first position of the rotary drum, and wherein the rotary drum is configured to rotate to a second position where the fastener is aligned to the coupler.
3. The fastener delivery system of claim 1, wherein the delivery location is a fastener tool or an intermediate storage bin.

4. The fastener delivery system of claim 1, wherein a length of the coil is at least greater than a length of the fastener.

5. The fastener delivery system of claim 1, further comprising a drive circuit electrically coupled to the coil, wherein the drive circuit selectively supplies the current through the coil.

6. The fastener delivery system of claim 5, wherein the drive circuit selectively discontinues the current through the coil after a predetermined condition.

7. The fastener delivery system of claim 5, wherein the drive circuit includes:
   an energy bank configured to store energy from a power source;
   a trigger switch interconnected between the coil and the energy bank; and
   a charging switch interconnected between the energy bank and the power source.

8. The fastener delivery system of claim 7, further comprising:
   a power converter interconnected between the charging switch and the power source, wherein the power converter is configured to convert input power to a desired output power; and
   a controller interfaced with the trigger switch and the charging switch.

9. The fastener delivery system of claim 8, wherein the controller closes the charging switch while the trigger switch remains open, thereby storing energy in the energy bank.

10. The fastener delivery system of claim 8, wherein the controller closes the trigger switch to supply current from the energy bank to the coil, thereby generating the magnetic field.

11. The fastener delivery system of claim 8, wherein the controller closes the trigger switch based on an external signal.

12. The fastener delivery system of claim 7, wherein the energy bank is comprised of at least one capacitor.

13. The fastener delivery system of claim 1, further comprising one or more additional coils wound around the feed tube, wherein a corresponding current applied through each of the one or more additional coils generates a corresponding magnetic field, and wherein the one or more additional coils are located between the coil and the delivery location.

14. The fastener delivery system of claim 13, further comprising a dedicated energy bank for each of the one or more additional coils.

15. The fastener delivery system of claim 1, further comprising:
   a braking sensor located on the feed tube that senses the fastener; and
   a braking mechanism located on the feed tube between the braking sensor and the delivery location, wherein the braking mechanism operates to decrease a velocity of the fastener in response to the braking sensor sensing a presence of the fastener.

\* \* \* \* \*